Aug. 7, 1934.   H. D. JOHNSON   1,969,512
INSTRUMENT MOUNTING
Filed Jan. 28, 1933
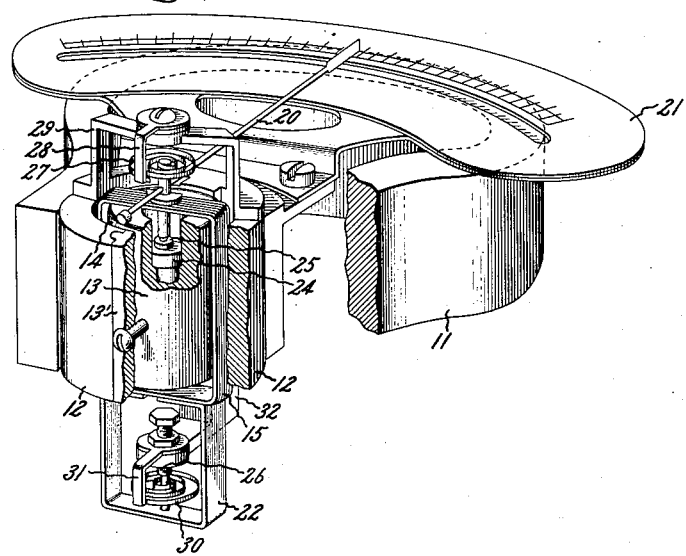
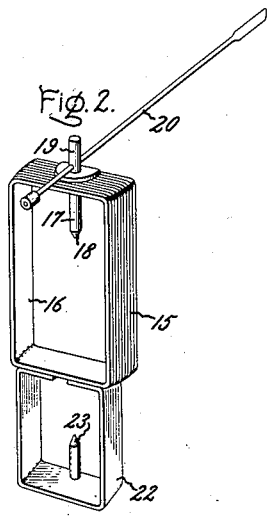
Inventor:
Herbert D. Johnson,
by Charles E. Tuller
His Attorney.

Patented Aug. 7, 1934

1,969,512

UNITED STATES PATENT OFFICE 1,969,512

INSTRUMENT MOUNTING

Herbert D. Johnson, Schenectady, N. Y., assignor to General Electric Company, a corporation of New York Application January 28, 1933, Serial No. 654,096

6 Claims. (Cl. 171—95)

My invention relates to deflecting instruments, concerning particularly indicating electrical instruments, and has for its principal object the provision of a mounting arrangement for the moving element of an instrument giving a minimum of friction without the sacrifice of sturdiness or portability. Other and further objects and advantages will become apparent as the description proceeds.

In accordance with my invention in its preferred form, I utilize a movable element in which the pointed pivots extend inward from the ends of the elements instead of outward so that the weight of the movable element is borne by the upper pivot and the center of gravity falls slightly below the upper pivot. In this manner side thrust and the friction caused thereby are minimized. In order to maintain a normal distance between pivots, the lower pivot is mounted upon a bracket extending downwardly from the main portion of the movable element.

The features of my invention which I believe to be novel and patentable will be pointed out in the claims appended hereto. A better understanding of my invention itself, however, may be obtained by referring to the following description taken in connection with the accompanying drawing, in which Fig. 1 is a view in perspective of an embodiment of my invention showing a portion of the apparatus broken away for clearness, and Fig. 2 is a view in perspective of the movable element employed in the apparatus shown in Fig. 1.

Referring now more in detail to the drawing, in which like reference characters refer to like parts throughout, I have shown my invention applied to an instrument of the D'Arsonval type, but it will be understood that the example given is only illustrative and my invention may be carried out in connection with instruments of any type employing rotatable elements.

In the instrument here shown by way of illustration, a permanent magnet 11 provided with pole pieces 12 is employed to produce a magnetic field which flows through a cylindrical core 13 placed between the pole pieces 12 so that a magnetic field traverses the air gaps 14 formed between the core 13 and the pole pieces 12. The core 13 is supported in any suitable manner, such as, for example, by bolting it to a nonmagnetic member 13' separating the edges of the pole pieces 12.

A current-conducting coil 15 wound upon a shell 16 is mounted so that it may be deflected in the air gaps 14 in response to the reaction between current flowing in the winding 15 and the flux produced by the permanent magnet 11. Shell 16 carries at its upper end a vertical spindle 17, the lower end of which 18 is pointed to form a main pivot for the movable element. The pivot 18 obviously supports the weight of the movable element. The upwardly extending portion 19 of the spindle 17 carries the pointer 20 cooperating with a scale 21 so that the center of gravity of the movable element tends to rise above the geometrical center of the coil, bringing the center of gravity slightly below the pivot point 18. Although I have, for convenience in description, referred to the spindle 17 as being integral, it will be understood that the upwardly and downwardly extending portions 19 and 18 may also be independent and be separately attached to the movable element 15.

If desired, the lower pivot serving as a guide pivot might be mounted in a similar manner extending upwardly from the lower portion of the shell 16. This construction, however, would tend to bring the pivot points so close together that a tendency toward side friction might still result in case the element were not perfectly balanced, since reducing the distance between pivots obviously would increase the leverage of a transverse force against the pivots in case the center of gravity of the element should prove to be slightly off-center. In order to minimize further any possible tendency toward friction, I prefer to attach a bracket 22 to the lower portion of the shell 16 and mount an upwardly extending pivot 23 upon the bracket 22, thereby obtaining a normal spacing between pivot points.

Suitable bearings such as cup-shaped bearings or jewels mounted in any suitable manner may be provided for supporting the pivot points 18 and 23. A construction which I have found satisfactory is to provide a plug 24 fitted into a cylinder recess bored coaxially with the core 13 in the upper end of said core. A suitable bearing such as the jewel 25 is mounted, preferably removably, in the plug 24. The lower or guide pivot 23 likewise cooperates with a suitable bearing 26.

In order to provide means for conducting current to and from the movable element, and also, if desired, in order to bias the element to a given position, I may provide spiral springs or conductors. An upper spiral member 27 is attached at one end to an arm 28 adjustably mounted upon a bracket 29 carried by the stationary member and at the other end to the portion 19 of the spindle 17. Likewise, a lower spiral member 30 may be provided attached at one end to an arm 31 adjustably mounted on a bracket 32 and attached at the other end to the spindle 23.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In an instrument having a rotatable element, a mounting arrangement for said rotatable element comprising an upper pivot having a point extending downwardly from the upper portion of said element, a bracket attached to and extending downwardly from the lower portion of said element, a lower pivot having a point extending upwardly from said bracket, and bearings cooperating with said pivot points.

2. A movable coil for an indicating instrument comprising a shell, an upper pivot having a point extending downwardly from the upper portion of said shell, a bracket attached to and extending downwardly from the lower portion of said shell, and a lower pivot having a point extending upwardly from said bracket, thereby bringing the center of gravity of said element below the upper weight-supporting pivot.

3. In a moving coil instrument, a movable element therefor comprising a winding shell, an upper main pivot having a point extending downwardly from the upper portion of said shell to a point slightly above the center of gravity of said movable element, a bracket attached to and extending downwardly from the lower portion of said shell, and a lower guide pivot having a point extending upwardly from said bracket.

4. In a deflecting instrument, a movable element therefor comprising a frame carrying the torque-producing element, a spindle attached to the upper portion of said frame having an upwardly projecting portion carrying a pointer, and a downwardly projecting portion forming an upper main pivot having a point extending downwardly from the upper portion of said frame a bracket attached to and extending downwardly from the lower portion of said frame, and a lower pivot having a point extending upwardly from said bracket, thereby causing the center of gravity of said movable element to be located slightly below the main pivot supporting its weight.

5. A deflecting instrument comprising a stationary member and a movable member, said movable member comprising a frame, a spindle attached to the upper portion of said frame having an upwardly extending portion and a downwardly extending portion tapered to form a main pivot having a point extending downwardly from the upper portion of said frame, a bracket attached to and extending downwardly from the lower portion of said deflecting element, a spindle extending upwardly from said bracket and having an end tapered to form a guide pivot with an upwardly extending point, said stationary member having bearings cooperating with said pivot points and including a pair of spiral springs, one of which is attached to the upwardly extending portion of said upper spindle and to a portion of the stationary member, and the other of which is attached to said lower spindle and to a portion of said stationary member.

6. An electrical instrument having a stationary member comprising a field-producing element having a pair of pole pieces and a substantially cylindrical core located between said pole pieces and so conforming in shape thereto as to leave a pair of air gaps between said pole pieces and said core, and a movable element comprising a shell carrying a current-conducting winding surrounding said core, a main pivot having a point extending downwardly from the upper portion of said shell, a bracket attached to and extending downwardly from the lower portion of said shell, and a guide pivot having a point extending upwardly from said bracket, thereby causing the center of gravity of said movable element to be located below the main pivot supporting its weight, said core having a coaxial cylindrical recess in the upper portion thereof and a bearing supported in the lower portion of said recess to cooperate with said main pivot and said stationary member including a bracket carrying a guide bearing cooperating with said guide pivot.

HERBERT D. JOHNSON.